US009541214B2

United States Patent
Penning et al.

(10) Patent No.: US 9,541,214 B2
(45) Date of Patent: Jan. 10, 2017

(54) SWITCHING MODULE FOR A VALVE CONTROLLER

(71) Applicant: General Equipment and Manufacturing Company, Inc., Louisville, KY (US)

(72) Inventors: Bruce R. Penning, Louisville, KY (US); Robert Lynn LaFountain, Charlestown, IN (US); Bruce Rigsby, Charlestown, IN (US); Scott Carpenter, Sellersburg, IN (US)

(73) Assignee: General Equipment and Manufacturing Company, Inc., Louisville, KY (US)

( * ) Notice: Subject to any disclaimer, the term of this patent is extended or adjusted under 35 U.S.C. 154(b) by 135 days.

(21) Appl. No.: 14/448,799

(22) Filed: Jul. 31, 2014

(65) Prior Publication Data
US 2015/0034848 A1    Feb. 5, 2015

Related U.S. Application Data

(60) Provisional application No. 61/861,361, filed on Aug. 1, 2013.

(51) Int. Cl.
*F16K 31/06* (2006.01)
*F16K 37/00* (2006.01)
*G01D 5/14* (2006.01)

(52) U.S. Cl.
CPC ........... *F16K 31/06* (2013.01); *F16K 37/0033* (2013.01); *G01D 5/145* (2013.01)

(58) Field of Classification Search
CPC ....... F16K 31/06; F16K 37/0033; G10D 5/145

USPC ......................... 251/129.04; 137/1, 553–554
See application file for complete search history.

(56) References Cited

U.S. PATENT DOCUMENTS

| | | | | |
|---|---|---|---|---|
| 6,206,042 B1 * | 3/2001 | Channell | ............. | B01J 49/0095 137/271 |
| 6,662,821 B2 * | 12/2003 | Jacobsen | ................. | F16K 31/05 137/2 |
| 6,892,751 B2 * | 5/2005 | Sanders | .................. | E03B 7/071 137/312 |

(Continued)

FOREIGN PATENT DOCUMENTS

EP        0 941 968 A2       9/1999

OTHER PUBLICATIONS

International Search Report and Written Opinion from International Application No. PCT/US2014/049352, dated Apr. 22, 2016.

(Continued)

*Primary Examiner* — John Bastianelli
(74) *Attorney, Agent, or Firm* — Marshall, Gerstein & Borun LLP

(57) ABSTRACT

A valve controller assembly includes a first switch that generates a first input signal based on an operational parameter of a control valve, and a docking assembly is communicatively coupled to the first switch. A switching module is removably secured to and communicatively coupled to the docking assembly such that the first switch is communicatively coupled to the switching module when the switching module is secured to the docking member. The switching module includes a first emulation circuit adapted to receive the first input signal, process the first input signal, and output a first output signal that is different than the first input signal.

21 Claims, 5 Drawing Sheets

(56) References Cited

U.S. PATENT DOCUMENTS

| | | | |
|---|---|---|---|
| 8,400,241 B2* | 3/2013 | Simmons | H01H 36/0073 335/205 |
| 2007/0289635 A1* | 12/2007 | Ghazarian | F16K 31/055 137/312 |
| 2009/0240376 A1* | 9/2009 | Elshafei | G05D 7/0635 137/2 |
| 2010/0155635 A1* | 6/2010 | Fima | F16K 37/0075 251/129.01 |

OTHER PUBLICATIONS

International Preliminary Report on Patentability from International Application No. PCT/US2014/049352, dated May 31, 2016.

\* cited by examiner

SWITCHING MODULE FOR A VALVE CONTROLLER

FIELD OF THE DISCLOSURE

This disclosure relates generally to control valves, and, more particularly, to controllers used to control the operation of control valves.

BACKGROUND

Control valves are used in process control systems to control conditions such as flow, pressure, temperature, and/or liquid level by fully or partially opening or closing in response to a signal received from one or more valve controllers. Typically, a valve controller is operatively coupled to or includes one or more sensors or switches disposed within the system, thereby allowing the valve controller to compare one or more "setpoints" to a corresponding "process variable" whose value is provided by the switches or sensors. The opening or closing of control valves is typically done automatically by electrical, hydraulic, or pneumatic actuators. In addition, positioners may be used to control the opening or closing of the actuator based on, for example, electric or pneumatic signals received from the valve controller.

In typical control valve assemblies, the one or more switches (such as proximity switches) or other sensors in communication with the valve controller are adapted to detect one or more targets (made of magnetic or ferrous material, for example) that are coupled to a portion of the valve (e.g., a valve stem) to determine one or more operational parameters of the control valve, such as the position of the closure member of the control valve. The one or more switches or other sensors are generally soldered or otherwise fixed to a printed circuit board ("PCB") disposed within an interior of an enclosure of the valve controller. The one or more switches or other sensors are chosen for a unique application. For example, Namur sensors may be used when it is desired that a resistance output increases from low to high when a target is within a predetermined range of the Namur sensor. As another example, in environments in which flammable gas is present, the valve controllers must not output a voltage (or current) above a threshold value that is capable of igniting the flammable gas. Because unique switches and/or sensors (or circuits that include the switches and/or sensors) and are required for a correspondingly unique output type, a large inventory of switches is necessary to accommodate custom applications. In addition, changing out the switches that are fixed to the PCB in an existing valve controller is extremely difficult. Consequently, if a different output type of output is desired, an entirely different valve controller must be purchased and installed.

BRIEF SUMMARY OF THE DISCLOSURE

In accordance with one exemplary aspect of the present invention, a valve controller system includes a first switch that generates a first input signal based on an operational parameter of a control valve. A docking assembly is communicatively coupled to the first switch, and a first switching module is adapted to be removably secured to and communicatively coupled to the docking assembly such that the first switch is communicatively coupled to the first switching module when the first switching module is secured to the docking assembly. The first switching module includes a first emulation circuit adapted to receive the first input signal, process the first input signal, and output a first output signal that is different than the first input signal.

In accordance with another exemplary aspect of the present invention, a control valve assembly includes a control valve having an inlet, an outlet, and a closure element adapted to displace from a first position in which process fluid flows from the inlet to the outlet to a second position in which process fluid is prevented from flowing from the inlet to the outlet. The control valve assembly also includes an actuator coupled to the closure element to displace the closure element. In addition, the control valve assembly includes a valve controller in communication with the actuator to control the displacement of the closure element. The valve controller has a first switch that generates a first input signal based on an operational parameter of a control valve and a docking assembly communicatively coupled to the first switch. The valve controller further includes a first switching module adapted to be removably secured to and communicatively coupled to the docking assembly such that the first switch is communicatively coupled to the first switching module when the first switching module is secured to the docking assembly. The first switching module includes a first emulation circuit adapted to receive the first input signal, process the first input signal, and output a first output signal that is different than the first input signal.

In accordance with another exemplary aspect of the present invention, a method of operating a valve controller assembly is disclosed, and the valve controller assembly includes a first switch that generates a first input signal based on an operational parameter of a control valve and a docking assembly communicatively coupled to the first switch. The method includes securing a first switching module to the docking assembly such that the first switching module is communicatively coupled to the docking assembly. The first switching module includes a first emulation circuit adapted to receive the first input signal, process the first input signal, and output a first output signal that is different than the first input signal. The method also includes removing the first switching module from the docking assembly such that the first switching module is not communicatively coupled to the docking assembly. The method further includes securing a second switching module to the docking assembly such that the second switching module is communicatively coupled to the docking assembly, the second switching module including a second emulation circuit adapted to receive the first input signal, process the first input signal, and output a second output signal that is different than the first input signal and the first output signal.

In accordance with still another exemplary aspect of the present invention, a method of controlling a control valve includes generating a first input signal from a first switch, the first input signal being based on an operational parameter of the control valve. The method also includes processing the first input signal using a first emulation circuit included in a first switching module, the first switching module being communicatively coupled to a docking assembly that is communicatively coupled to the first switch. The method further includes outputting a first output signal from the first emulation circuit, the first output signal being different than the first input signal.

DETAILED DESCRIPTION

Figure 1A:
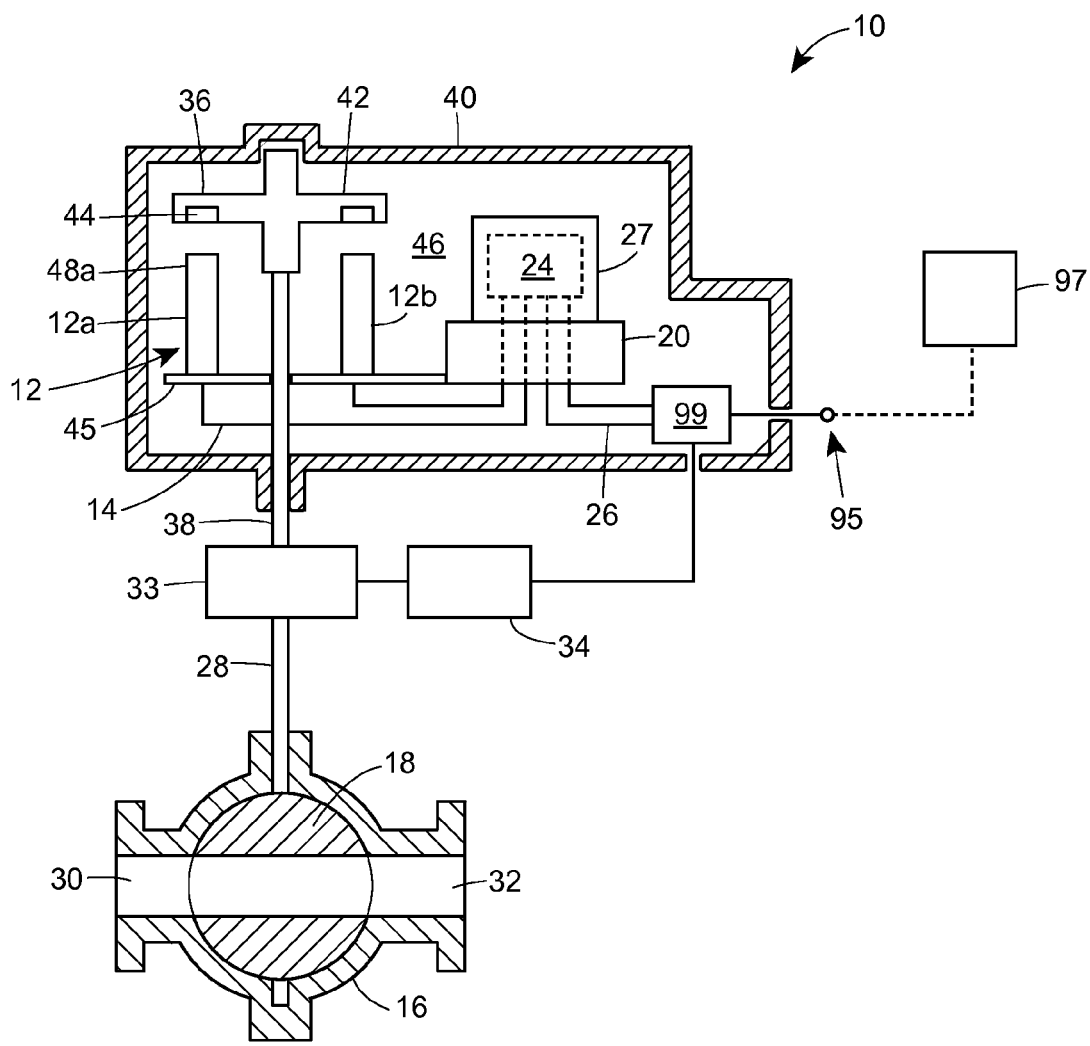
FIG. 1A is schematic view of a control valve assembly that includes a control valve, an actuator, and an embodiment of a valve controller system having a first switching module.
Figure 1B:
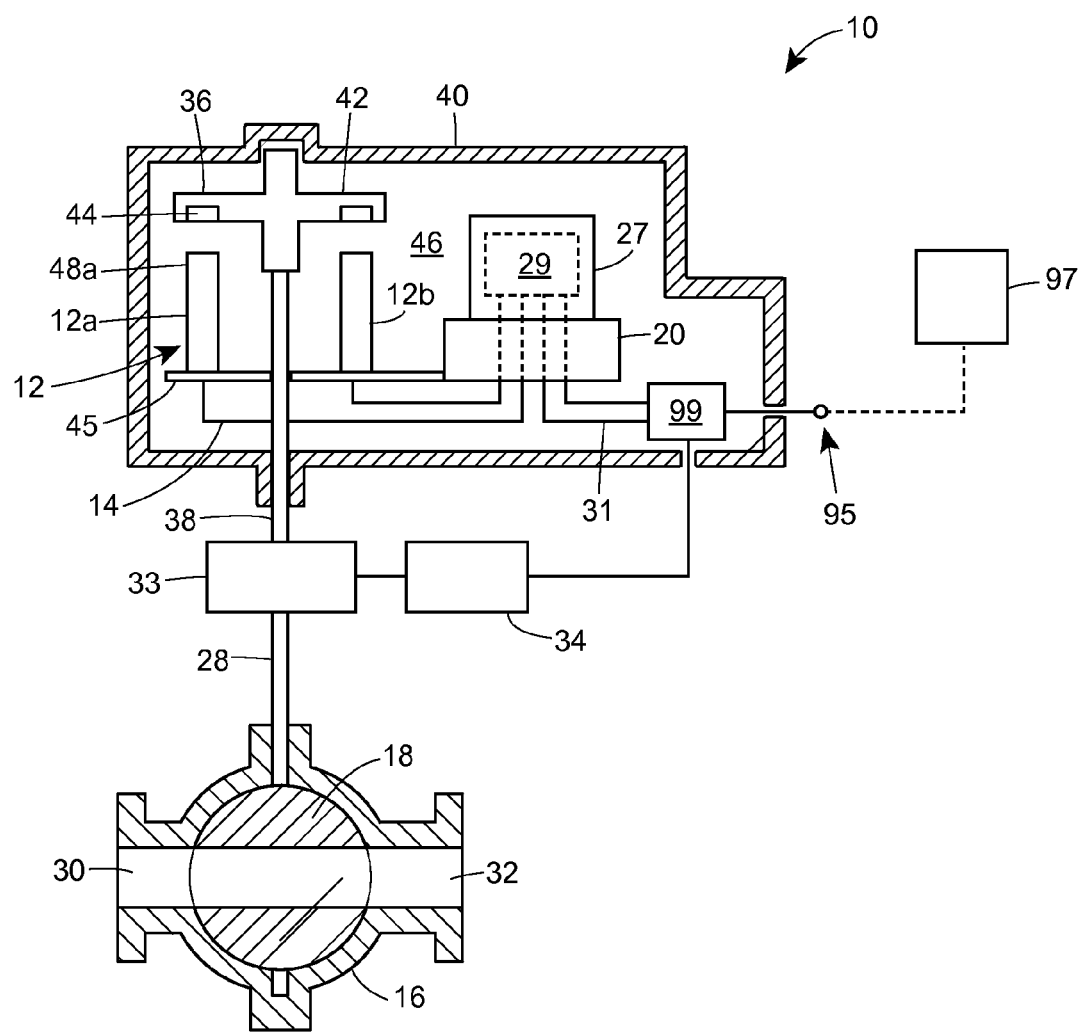
FIG. 1B is schematic view of a control valve assembly that includes a control valve, an actuator, and an embodiment of a valve controller system having a second switching module.

As illustrated in FIG. 1A, a valve controller assembly 10 includes a first switch 12a that generates a first input signal 14 based on an operational parameter of a control valve 16, such as the position of a closure element 18 of the valve 16. The valve controller assembly 10 further includes a docking assembly 20 communicatively coupled to the first switch 12a. The valve controller assembly 10 also includes a first switching module 22 removably secured to and communicatively coupled to the docking assembly 20 such that the first switch 12a is communicatively coupled to the first switching module 22 when the first switching module 22 is secured to the docking assembly 20. The first switching module 20 includes a first emulation circuit 24 adapted to receive the first input signal 14, process the first input signal 14, and output a first output signal 26 that is different than the first input signal 14. As illustrated in FIG. 1B, a second switching module 27 may be adapted to be removably secured to and communicatively coupled to the docking assembly 20 such that the first switch 12a is communicatively coupled to the second switching module 27 when the second switching module 27 is secured to the docking assembly 20. The second switching module 27 may include a second emulation circuit 29 adapted to receive the first input signal 14, process the first input signal 14, and output a second output signal 31 that is different than the first input signal 14 and the first output signal 26.

So configured, the valve controller assembly 10 may include a single type of first switch 12a, such a magnetically-triggered proximity switch, that cooperates with the first emulation circuit 24 of the first switching module 22 to provide an output signal that is identical to one of several different switches, such as a Namur normally open ("N/O") switch or a Namur normally closed ("N/C") switch. If a different output signal is desired, a corresponding one of two or more switching modules, such as the second switching module 27, may be inserted in the docking assembly 20. Consequently, a desired signal output may be achieved by inserting a desired switching module 22, 27 into the docking assembly 20. Accordingly, a single type of first switch 12a, such as a magnetically-triggered proximity switch, may replace a variety of switches (such as a Namur N/C, Namur N/O, and/or a SPDT switch) with the use of an appropriate switching module 22, 27, thereby eliminating the need to maintain a large inventory of switches for custom applications. Moreover, because it easy to remove and replace the switching modules 22, 27, valve controllers can be modified in the field quickly and inexpensively.

Turning to the valve controller assembly 10 in more detail, the valve controller assembly 10 includes the first switch 12a, as illustrated in FIG. 1A. The first switch 12a generates the first input signal 14 that is based on an operational parameter of a control valve 16, such as, for example, the position of the closure element 18 of the control valve 16. The control valve 16 may be any suitable control valve that is adapted to regulate the flow of fluid through the valve. For example, the control valve 16 may be a valve having a closure element 18 that rotates about a shaft 28 from a first fully open position (illustrated in FIG. 1A) to a second closed position (not shown). In the first fully open position, fluid may flow from an inlet 30, through or around the closure element 18, and to an outlet 32. In the second closed position, the closure element 18 may partially or completely obstruct the flow of fluid from the inlet 30 to the outlet 32. The shaft 28 may be rotated or caused to rotate by a valve actuator 33 that may itself be controlled by a valve positioner 34 that may be communicatively coupled to the valve controller assembly 10. The valve actuator 33 may be an electrical, pneumatic, or hydraulic actuator, for example, and the valve actuator 33 may rotate the shaft 28 (or cause the shaft 28 to rotate) in a known manner. In alternative embodiments, the closure element 18 may linearly displace from a first fully open position to a second closed position, and the valve positioner 34 may linearly displace the closure element 18 or may cause the closure element 18 to linearly displace.

Still referring to FIG. 1A, the valve controller assembly 10 may include a target assembly 36 that may be coupled to the closure element 18. For example, the target assembly 36 may be coupled to the shaft 28 such that the target assembly 36 rotates when the shaft 28 rotates. The target assembly 36 may include a target shaft 38 that may be directly or indirectly coupled to the shaft 28 such that a rotation of the shaft 28 results in a corresponding rotation of the target shaft 38. A first portion of the target shaft 38 may extend through a controller enclosure 40 and a second portion of the target shaft 38 may be disposed within a blind bore formed in the in the controller enclosure 40. A target support 42 may be secured to a third portion of the target shaft 38, with the third portion disposed between the first portion and the second portion, and the second portion, the third portion, and the target support 42 are all disposed within an interior volume 46 of the controller enclosure 40. The target support 42 may include one or more spokes that extends radially outward from a hub disposed at the third portion of the target shaft 38. The target support 42 may alternatively have the shape of a disc that extends radially outward from the third portion of the target shaft 38. One or more targets 44 (e.g., magnetic targets or ferrous targets) may be coupled to the target support 42 at or near the outward end portion of the disk or of each spoke, for example. If more than one target 44 is used, the targets 44 may be uniformly arrayed in equal angular increments around a longitudinal axis of the target shaft 38, for example. Each of the targets 44 may be made from a metal or ferrous material.

Figure 2A:
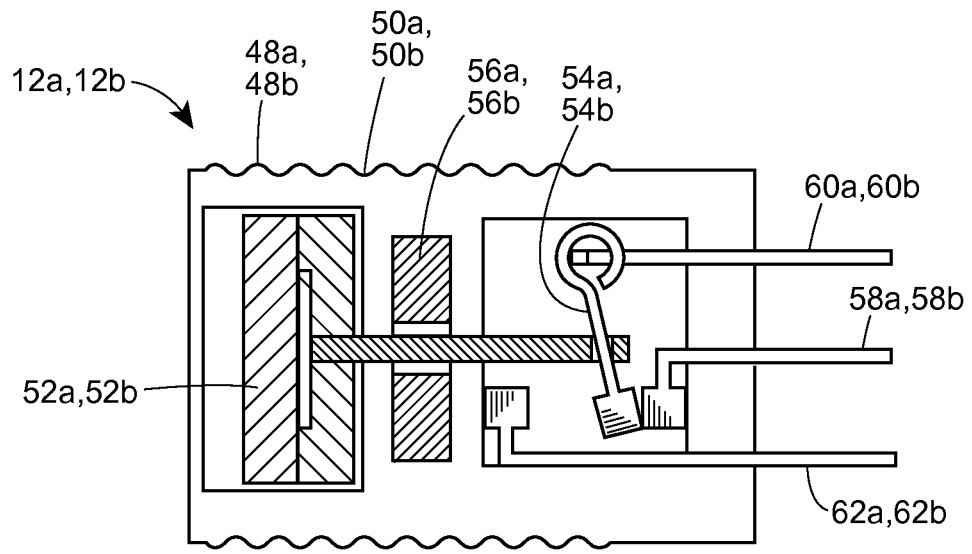
FIG. 2A is a sectional view of an embodiment of a proximity switch adapted for use in the valve controller system of FIG. 1A, with the proximity switch in a first position.
Figure 2B:
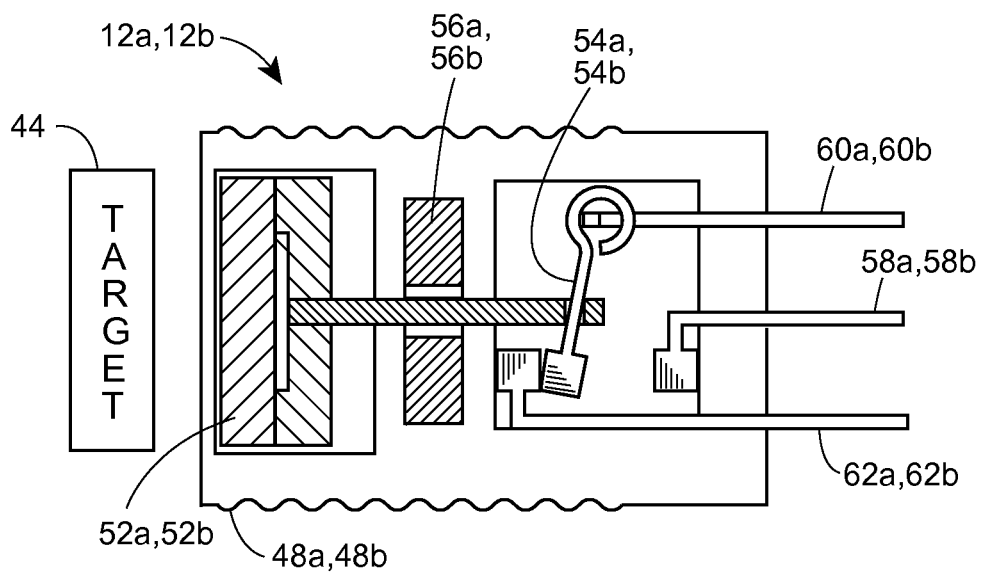
FIG. 2B is a sectional view of the embodiment of the proximity switch of FIG. 2A with the proximity switch in a second position.

Still referring to FIG. 1A, the first switch 12a may be disposed within the interior volume 46 of the controller enclosure 40. For example, the first switch 12a may be secured to a portion of a printed circuit board ("PCB") 45 (or an assembly of PCBs) in a position adjacent to the target assembly 36. The first switch 12a may be any switch or sensor known in the art that is capable of changing state based on an operational parameter of the control valve 16 and/or that is capable detecting the presence of a target 44. For example, the first switch 12a may be a proximity switch that is adapted to detect the presence of one of the targets 44 when the target 44 is within a predetermined distance of a first end 48*a* of the first switch 12*a*. Because each of the one or more targets 44 is secured to the target support 42 that rotates as the shaft 28 rotates, the first switch 12*a* can detect or can cooperate with additional switches to determine the position of the closure element 18 of the control valve 16. The first switch 12*a* may be any suitable type of limit switch, such as a magnetically-triggered limit switch (such as the magnetically-triggered proximity switches disclosed in U.S. Pat. No. 8,400,241, which is incorporated herein by reference). For example, as illustrated in FIGS. 2A and 2B, the first switch 12*a* may include a switch housing 50*a* that encloses a movable magnet 52*a* coupled to a pivotable arm 54*a*, and the movable magnet 52*a* may be biased into a first switch position (illustrated in FIG. 2A) by a stationary magnet 56*a* that exerts a magnetic force on the movable magnet 52*a*. In this first switch position, a contact at an end of the pivoable arm 54*a* may engage a contact at an end of a primary arm 58*a* such that a circuit is closed between the primary arm 58*a* and a common arm 60*a* (that is coupled to the pivoable arm 54*a*). Accordingly, current may pass between the common arm 60 and the primary arm 58*a*, and this current may indicate that the first switch 12*a* is in the first switch position.

When one of the one or more targets 44 is moved into a predetermined range of the first end 48*a* of the first switch 12*a*, as illustrated in FIG. 2B, the magnetic force between the target 44 and the movable magnet 52*a* is stronger than the magnetic force between the movable magnet 52*a* and the stationary magnet 56*a*. Consequently, the movable magnet 52*a* linearly translates away from the stationary magnet 56*a* and towards the target 44*a*, thereby rotating the pivotable arm 54*a* about an end of the common arm 60*a*. Accordingly, the contact at the end of the pivotable arm 54*a* disengages from the primary arm 58*a* and rotates into engagement with a contact at the end of a secondary arm 62*a* such that a circuit is closed between the secondary arm 62*a* and the common arm 60*a*. In this second switch position, a circuit is closed between the secondary arm 62*a* and the common arm 60*a* allowing current to pass between the common arm 60*a* and the secondary arm 62*a*, and this current may indicate that the first switch 12*a* is in the second switch position.

In addition to the first switch 12*a*, any number of additional switches may be used in the valve controller assembly 10. For example, a second switch 12*b* may be used, and the second switch 12*b* may be identical to the first switch 12*a*. Accordingly, current may pass between the common arm 60*b* and the primary arm 58*b* when the second switch 12*b* is in the first switch position. When one of the one or more targets 44 is moved into a predetermined range of the first end 48*b* of the second switch 12*b*, the second switch 12*b* may change to the second switch position in which current may pass between the common arm 60*b* and the secondary arm 62*b*. A third switch 12*c*, a fourth switch 12*d*, etc., may be used to provide additional resolution in determining the position of the valve element 18, as is known in the art. While the second switch 12*b* (or any additional switches) may be identical to the disclosed embodiment of the first switch 12*a*, the second switch 12*b* (or any additional switches) may be any switch or sensor known in the art that is capable of changing state based on an operational parameter of the control valve 16 and/or that is capable detecting the presence of a target, such as the target 44.

Figure 3:
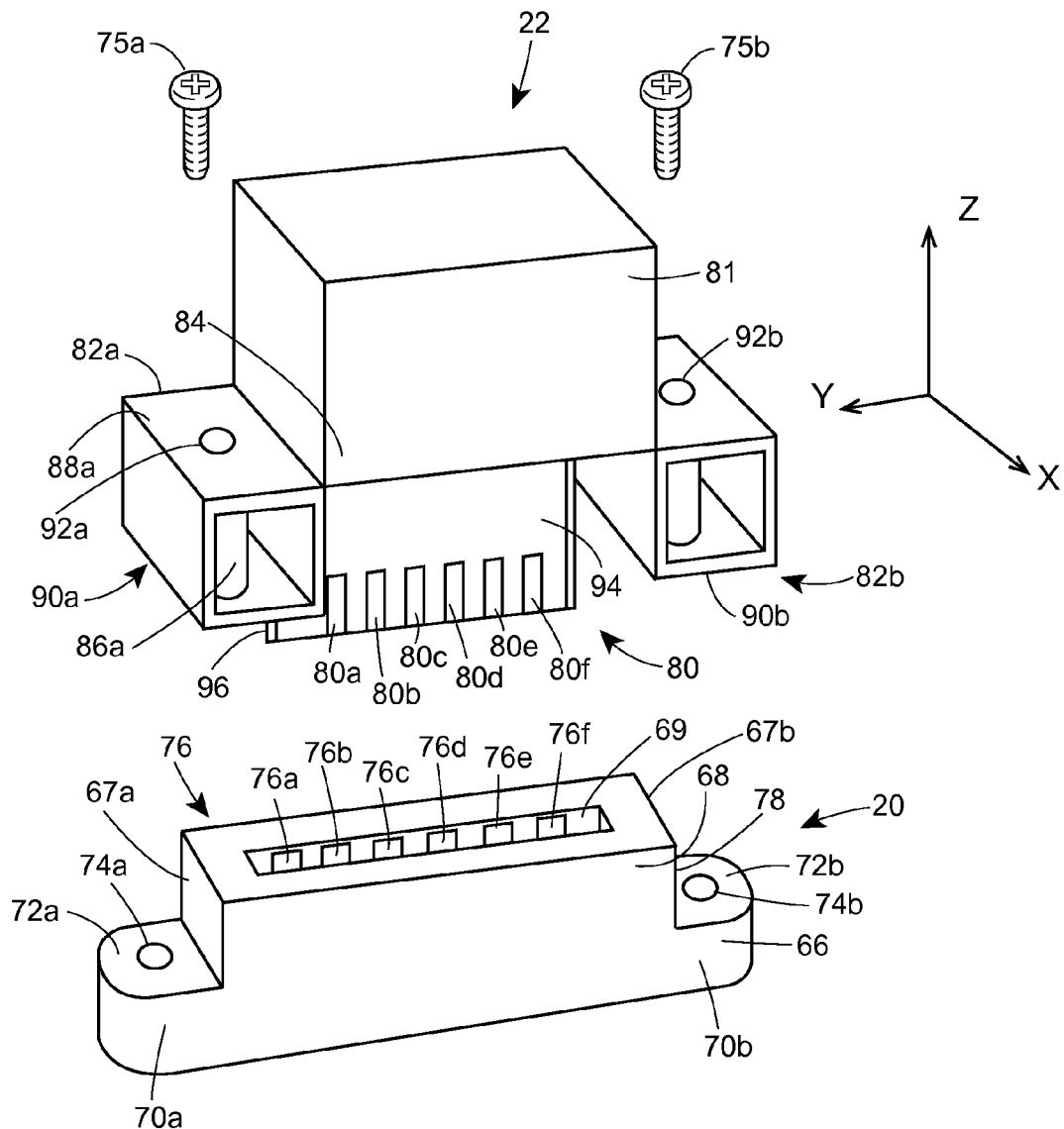
FIG. 3 is a perspective view of the valve controller system of FIG. 1A.

Referring again to FIG. 1A, the valve controller assembly 10 also includes the docking assembly 20 communicatively coupled to the first switch 12*a* and adapted to be communicatively coupled to the first switching module 22. The docking assembly 20 may be disposed within the interior volume 46 of the controller enclosure 40, and the docking assembly 20 may be secured to the PCB 45. The docking assembly 20 may include any type of connector or connectors that allow the first switching module 22 to be removably coupled to the docking assembly 20 and that allow the first switching module 22 to be coupled to the first switch 12*a*. For example, the docking assembly 20 may include an edge connector having a female receiving portion that is adapted to releasably receive a male portion of the first switching module 22. As illustrated in FIG. 3, the docking assembly 20 may include a base portion 66 that may be secured to the PCB 45 (see FIG. 1A), and a top portion 68 may extend vertically (i.e., along or parallel to the Z-axis of the reference coordinate system provided in FIG. 3) upward from the base portion 66. The top portion 68 may include a plurality of vertical interior walls that collectively define a slot 69 that is adapted to receive the male portion of the first switching module 22, and the slot 69 may extend along or parallel to the Y-axis of the reference coordinate system of FIG. 3. The base portion 66 may include a first flange portion 70*a* that extends beyond a first side wall 67*a* of the top portion 68. The first flange portion 70*a* may have a planar first top wall 72*a*, and a first threaded bore 74*a* may vertically extend in a downward direction through the first top wall 72*a*. The base portion 66 may also include a second flange portion 70*b* that extends beyond a second side wall 67*b* of the top portion 68. The second flange portion 70*b* may have a planar second top wall 72*b*, and a second threaded bore 74*b* may vertically extend in a downward direction through the second top wall 72*b*. Each of the first and second threaded bores 74*a*, 74*b* may be adapted to receive a bolt 75*a*, 75*b* coupled to a portion of the first switching module 22 to secure the first switching module 22 to the docking assembly 20.

Still referring to FIG. 3, the docking assembly 20 may have one or more docking contacts 76 that may each be adapted to be communicatively coupled to corresponding conductive elements of the first switch 12*a* and any additional switches. Each of the docking contacts 76 of the docking assembly 20 may be coupled to the top portion 68 adjacent a first end 78 of the docking assembly 20. More specifically, each of the docking contacts 76 may be coupled to one of the plurality of vertical interior walls that collectively define the slot 69 such that the when the first switching module 22 is coupled to the docking assembly 20, a module contact 80 is communicatively coupled to (e.g., in contact with) a corresponding one of the docking contacts 76. Each of the docking contacts 76 may be communicatively coupled to the corresponding module contact 80 in any suitable manner. For example, any or all of the one or more docking contacts 76 may be a leaf spring element made of a conductive material (e.g., copper or a copper alloy), with the leaf spring shape providing a biasing force that maintains contact between the docking contact 76 and the corresponding planar module contact 80. In alternative embodiments, any or all of the module contacts 80 may have a leaf spring shape and the corresponding docking contacts 76 may be planar.

Each of the docking contacts 76 may be communicatively coupled to a corresponding contact or arm of the one or more switches (e.g., the first switch 12*a*). One skilled in the art would recognize that the one or more switches (e.g., the first switch 12*a*) may be communicatively coupled in any manner to the docking contacts 76 to transmit the first input signal 14 (e.g., a signal indicating that the first switch 12*a* in the first switch position or in the second switch position) from the one or more switches 12 to the docking contacts 76 of the docking assembly 20. That is, one or more conductive pathways (such as a conductive pathway formed on the PCB 45) may transmit (or may cooperate to transmit, if more that one conductive pathways are employed) the first input signal 14 between the first switch 12a and the docking assembly 20 in any manner known the art. For example, a secondary arm 62a of the first switch 12a may be communicatively coupled (e.g., by a communication path on the PCB 45) to a first docking contact 76a, a primary arm 58a of the first switch 12a may be communicatively coupled to a second docking contact 76b, and a common arm 60a of the first switch 12a may be communicatively coupled to a third docking contact 76c.

Additional switches (e.g., a second switch 12b) may require additional docking contacts 76, as would be understood in the art. For example, if the second switch 12b is used, a secondary arm 62b, a primary arm 58b, and a common arm 60b of the second switch 12b may be communicatively coupled to additional corresponding docking contacts 76. If the first switch 12a and the docking assembly 20 are each secured to a single PCB (such as the PCB 45) by soldering, for example, then the secondary, primary, and common arms 62a, 58a, 60a may be connected to the first, second, and third docking contacts 76a, 76b, 76c, respectively, by conductive pathways formed on the PCB 45. Any additional switches coupled to the PCB 45 may be coupled to the docking assembly 20 in a similar manner. Any additional switches may be communicatively coupled to the docking assembly 20 to transmit an input signal Referring to FIGS. 1A, 1B, and 3, the valve controller assembly 10 may also include the first switching module 22 removably secured to and communicatively coupled to the docking assembly 20. The first switching module 22 may include a housing 81 that includes a plurality of walls that collectively define an interior that encloses the first emulation circuit 24 (as illustrated in FIGS. 1A and 1B), and the housing 81 may have any suitable shape or configuration to enclose and protect the first emulation circuit 24. For example, the plurality of walls defining the housing 81 may have a rectangular or square cross-section along any or all of the X-axis, the Y-axis, or the Z-axis of the reference coordinate system of FIG. 3. The first switching module 22 may include a first support element 82a disposed adjacent to a first end 84 of the housing 81. The first support element 82a may include a plurality of walls that extend along or parallel to the X-axis of the reference coordinate system of FIG. 3. The first support element 82a may include a cylindrical member 86a that vertically extends from a top wall 88a to a bottom wall 90a of the first support element 82a. A first bore 92a may extend through the cylindrical member 86a through the top wall 88a and the bottom wall 90a, and the bore 92a, and the first bore 92a may be coaxially aligned with the threaded bore 74a of the first flange portion 70a when the first switching module 22 is secured to the docking assembly 20. The first bore 92a may receive a first bolt 75a having a threaded bottom end that threadably engages the threaded bore 74a of the first flange portion 70a to releasably secure the first switching module 22 to the first flange portion 70a of the docking assembly 20. So secured, the bottom wall 90a of the first support element 82a may be in contact with or adjacent to the top wall 72a of the first flange portion 70a of the docking assembly 20.

The first switching module 22 may include a second support element 82b disposed adjacent to a first end 84 of the housing 81 and opposite the first support element 82a. The second support element 82b may be identical to the first support element 82a, and the second bore 92b may receive a second bolt 75b having a threaded bottom end that threadably engages the threaded bore 74b of the second flange portion 70b to releasably secure the first switching module 22 to the second flange portion 70b of the docking assembly 20. So secured, the bottom wall 90b of the second support element 82b may be in contact with or adjacent to the top wall 72b of the second flange portion 70b of the docking assembly 20.

With the first switching module 22 secured to the docking assembly 20 as described, each of the one or more module contacts 80 may be communicatively coupled to a corresponding one of the docking contacts 76. As illustrated in FIG. 3, each of the one or more module contacts 80 may be disposed on the surface of a planar card 94 that may be part of a PCB upon which the first emulation circuit 24 is disposed. When a first end 96 of the card 94 is disposed in the slot 69, and with the first switching module 22 secured to the docking assembly 20 as previously described, each of the one or more docking contacts 76 may be communicatively coupled to a corresponding one of the one or more module contacts 80. For example, a first module contact 80a may be in contact with the first docking contact 76a, a second module contact 80b may be in contact with the second docking contact 76b, and a third module contact 80c may be in contact with the third docking contact 76c. Each of the first module contact 80a, the second module contact 80b, and the third module contact 80c may be communicatively coupled to the first emulation circuit 24 in any manner known in the art. For example, each of the first module contact 80a, the second module contact 80b, and the third module contact 80c may be connected to the first emulation circuit 24 by conductive pathways formed on the PCB associated with the card 94.

The first emulation circuit 24 may be mounted to and/or formed on the PCB in any suitable manner that allows the first emulation circuit 24 to receive the one or more input signals 14 from one or more of the switches 12, process or condition the one or more input signals 14, and output one or more output signals 26, wherein the one or more output signals 26 has one or more different characteristics than the one or more input signals 14. The first emulation circuit 24 may include any appropriate components to process the one or more input signals 14 in a desired manner, such as one or more microprocessors, current limiting circuits, and/or current limiting circuits, for example.

In contemplated embodiments, the one or more input signals 14 may be processed or conditioned such that the one or more output signals 26 may be have a higher or lower resistance than the resistance associated with the one or more input signals 14. For example, the one or more input signals 14 may be processed or conditioned to emulate the output of a desired switch, such as a Namur N/O ("normally open") switch or a Namur N/C ("normally closed") switch. In these embodiments, a magnetically-triggered proximity switch may replace either of a Namur N/C and/or Namur N/O switch. In other embodiments, the one or more input signals 14 may be processed or conditioned such that the one or more output signals 26 may correspond to the output of a SPDT (single pole, double throw) switch, thereby allowing a magnetically-triggered proximity switch to emulate the output of a SPDT switch. In further embodiments, the one or more input signals 14 may have or correspond to a first voltage and the one or more output signals 26 may have or correspond to a second voltage that is not equal to the first voltage. In other embodiments, the one or more input signals 14 may have or correspond to a first current and the one or more output signals 26 may have or correspond to a second current that is not equal to the first current. The voltage or current levels of the one or more output signals 26 may be lower than a voltage or current levels of the one or more input signals 14. Such lower voltage or lower current output signals 26 may be below a voltage or current threshold that allows for intrinsically-safe operation in hazardous environments, such as flammable environments. In other embodiments, the voltage or current levels of the one or more output signals 26 may be higher than a voltage or current levels of the one or more input signals 14.

As would be appreciated by one skilled in the art, any or all of a Namur N/C, Namur N/O, SPDT, and/or other specialized switches may be replaced by a single switch, such as a magnetically-triggered proximity switch, thereby eliminating the need to maintain separate inventories of different switches. In addition, because the emulation circuitry 22 that corresponds to different switches is housed within the modular switching module 22 that is easily removed from and secured to the docking member 18, replacing an entire PCB—or an entire controller assembly—to change out one type of switch is no longer necessary, thereby reducing maintenance time and costs.

With the first switching module 22 secured to the docking assembly 20 as previously described, one or more module contacts 80 may be communicatively coupled to a one or more docking contacts 76 to conduct the one or more output signals 26. For example, as illustrated in FIG. 3, the first switching module 22 may include a fourth module contact 80d, a fifth module contact 80e, and a sixth module contact 80f, and each of the fourth, fifth, and sixth module contacts 80d, 80e, 80f may be communicatively coupled to the first emulation circuit 24 in any manner known in the art. In one embodiment, each of the fourth, fifth, and sixth module contacts 80d, 80e, 80f may be connected to the first emulation circuit 24 by conductive pathways formed on the PCB. As illustrated in FIG. 3, the fourth module contact 80d may be in contact with a fourth docking contact 76d, the fifth module contact 80e may be in contact with a fifth docking contact 76e, and the sixth module contact 80f may be in contact with a sixth docking contact 76f. Each of the fourth, fifth, and sixth docking contacts 76d, 76e, 76f may be communicatively coupled to an output or port 95 disposed on or coupled to the controller enclosure 40, as illustrated in FIG. 1A. The output or port 95 may be any suitable connector that allows one or more of the docking contacts 76 (such as one or more of the fourth, fifth, and sixth docking contacts 76d, 76e, 76f) to be communicatively coupled (using a wire or wireless connection) to a device, such as a remotely located processor or computer 97. In alternative embodiments, one or more of the docking contacts 76 (such as one or more of the fourth, fifth, and sixth docking contacts 76d, 76e, 76f) may be directly connected to a device, such as a remotely located processor or computer. The output or port may connected to the one or more of the docking contacts 76 (such as one or more of the fourth, fifth, and sixth docking contacts 76d, 76e, 76f) by conductive pathways formed on the same PCB on which the docking assembly 20 is secured.

The first input signal 14 may be a signal that is output from the first or second switches 12a, 12b (or any suitable additional switches), for example. Specifically, the first input signal 14 may be a signal sent or conducted from one or both of the primary arm 58a and the common arm 60a of the first switch 12a when the switch 12a is in the first switch position. As an alternative example, the first input signal 14 may be a signal sent or conducted from one or both of the secondary arm 62a and the common arm 60a of the first switch 12a when the switch 12a is in the second switch position. The first input signal 14 may be conducted by one or more wires or conduction paths, for example.

The first output signal 26 may be a signal that corresponds to the first input signal 14 but is different than the first input signal 14. For example, the first input signal 14 may be received and processed and/or conditioned by the first emulation circuit 24 of the switching module 20, and the first emulation circuit 24 may output the first output signal 26. For example, in the first switch position, a voltage may exist across the primary arm 58a and the common arm 60a of the first switch 12a. As previously explained, the voltage may be above a predetermined limit voltage, and the first emulation circuit 24 may output the first output signal 26 at a voltage below or at the predetermined limit voltage to allow for intrinsically-safe operation in hazardous environments, such as flammable environments. The first output signal 26 may be conducted by one or more wires or conduction paths, for example.

As illustrated in FIG. 1B, a second switching module 27 may be adapted to be removably secured to and communicatively coupled to the docking assembly 20 such that the first switch 12a is communicatively coupled to the second switching module 27 when the second switching module 27 is secured to the docking assembly 20. The second switching module 27 may be physically identical to the first switching module 22 and may be connected to the docking assembly 20 in the same manner as the first switching module 22, with the exception that the second switching module 27 includes a second emulation circuit 29 adapted to receive the first input signal 14, process the first input signal 14, and output a second output signal 31 that is different than the first input signal 14 and the first output signal 26.

The second emulation circuit 29 may be mounted to and/or formed on the PCB in any suitable manner that allows the second emulation circuit 29 to receive the one or more input signals 14 from one or more of the switches 12, process or condition the one or more input signals 14, and output one or more second output signals 31, wherein the one or more second output signals 31 has one or more different characteristics than the one or more input signals 14 and the first output signal 26. The second emulation circuit 29 may include any appropriate components to process the one or more input signals 14 in a desired manner, such as one or more microprocessors, current limiting circuits, and/or current limiting circuits, for example.

In contemplated embodiments, the one or more input signals 14 may be processed or conditioned such that the one or more second output signals 31 may be have a higher or lower resistance than the resistance associated with the one or more input signals 14. For example, the one or more input signals 14 may be processed or conditioned to emulate the output of a desired switch, such as a Namur N/O ("normally open") switch or a Namur N/C ("normally closed") switch. In these embodiments, a magnetically-triggered proximity switch may replace either of a Namur N/C and/or Namur N/O switch. In other embodiments, the one or more input signals 14 may be processed or conditioned such that the one or more second output signals 31 may correspond to the output of a SPDT (single pole, double throw) switch, thereby allowing a magnetically-triggered proximity switch to emulate the output of a SPDT switch. In further embodiments, the one or more input signals 14 may have or correspond to a first voltage and the one or more second output signals 31 may have or correspond to a second voltage that is not equal to the first voltage. In other embodiments, the one or more input signals 14 may have or correspond to a first current and the one or more second output signals 31 may have or correspond to a second current that is not equal to the first current. The voltage or current levels of the one or more second output signals 31 may be lower than a voltage or current levels of the one or more input signals 14. Such lower voltage or lower current output signals 31 may be below a voltage or current threshold that allows for intrinsically-safe operation in hazardous environments, such as flammable environments. In other embodiments, the voltage or current levels of the one or more second output signals 31 may be higher than a voltage or current levels of the one or more input signals 14.

In addition to the second switching module 27, any number of additional switching modules may be provided to be coupled to the docking assembly 20, and each additional switching module may include a corresponding emulation circuit that is configured to receive the first input signal 14, process the first input signal 14, and output a corresponding output signal that is different than the first input signal 14, the first output signal 26, and the second output signal 31.

The first output signal 26 and/or the second output signal 31 (and/or any further output signals associated with any further switching modules) may be provided to any suitable location or device over any number of communication lines, as is known in the art. For example, with reference to FIGS. 1A and 1B, the first or second output signal 26, 31 may be provided to the valve positioner 34 and adapted to adjust the actuator to linearly and/or rotationally displace the closure element 18 of the control valve 16. The first or second output signal 26, 31 may additionally (or alternatively) be provided to a communication module 99 that is adapted to communicate with remote devices, such as a processor or computer 97, for example. The output signal 26, 31 may additionally (or alternatively) be provided to one or more devices, such as a processor or computer, for example. The device(s) may be located remote from the control valve 16 or directly or indirectly secured to the control valve 16 or the controller enclosure 40.

Figure 4:
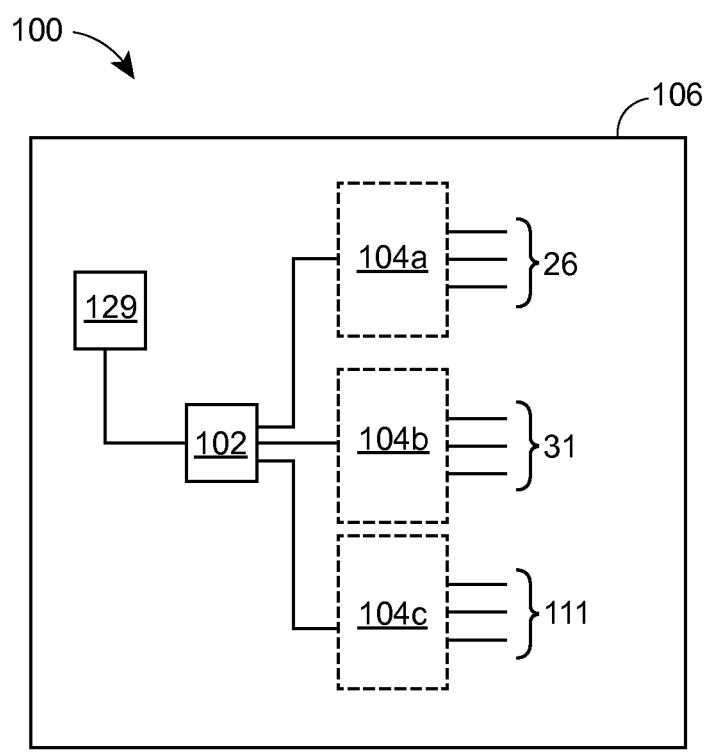
FIG. 4 is a schematic plan view of another embodiment of a valve controller system.

An alternative embodiment of a valve controller assembly 100 is illustrated in FIG. 4. In this valve controller assembly 100, a docking assembly 20 and removable switching module 22 is not used. Instead, a selection member is in communication with one or more switches (such as the first switch 12a that was previously described) and with each of two or more emulation circuits that are each adapted to process or condition the first input signal 14 from the first switch 12a (or additional input signals from additional switches) in the manner previously described to generate an output signal.

More specifically, as illustrated in FIG. 4, the valve controller assembly 100 includes one or more switches 12a that each generates a first input signal 14 based on an operational parameter of a control valve 16, as previously described. The valve controller assembly 100 also includes a selection member 102 in communication with the first switch 12a, and the selection member 102 has (at least) a first setting and a second setting. The selection member 102 may be any switch capable of placing the first switch 12a in communication with a first emulation circuit 104a, a second emulation circuit 104b, and/or further desired emulation circuits (e.g., a third emulation circuit 104c). For example, the selection member 102 may be a surface-mounted switch with two or more switch settings, such as a DIP switch. The selection member 102 may also be a jumper or an equivalent device. The first emulation circuit 104a, second emulation circuit 104b, selection member 102, and first switch 12a may be mounted to a single PCB 106 (or to two or more PCBs), and the PCB 106 (or the PCBs) may be disposed within an interior volume of a controller enclosure that may be similar or identical to the controller enclosure 40 previously described.

As illustrated in FIG. 4, the first switch 12a and to the selection member 102 may be in communication in any manner known in the art. That is, one or more conductive pathways (such as a conductive pathway formed on the PCB 106) may transmit (or may cooperate to transmit, if more than one conductive pathways are employed) the first input signal 14 between the first switch 12a and the selection member 102 in any manner known the art. The selection member 102 may be communicatively coupled to the first emulation circuit 104a by one or more conductive pathways (such as a conductive pathway formed on the PCB 106) to transmit the first input signal 14 to the first emulation circuit 104a when the selection member 102 is in the first setting. As previously described, the first emulation circuit 104a is adapted to receive the first input signal 14, process the first input signal 14, and output a first output signal 26 that is different than the first input signal 14.

The selection member 102 may also be communicatively coupled to the second emulation circuit 104b by one or more conductive pathways (such as a conductive pathway formed on the PCB 106) to transmit the first input signal 14 to the second emulation circuit 104b (instead of the first emulation circuit 104a) when the selection member 102 is in the second setting. As previously described, the second emulation circuit 104b is adapted to receive the first input signal 14, process the first input signal 14, and output a second output signal 31 that is different than the first input signal 14 and the first output signal 26.

The selection member 102 may also be communicatively coupled to the third emulation circuit 104c by one or more conductive pathways (such as a conductive pathway formed on the PCB 106) to transmit the first input signal 14 to the third emulation circuit 104c (instead of the first emulation circuit 104a) when the selection member 102 is in the third setting. The third emulation circuit 104c is adapted to receive the first input signal 14, process the first input signal 14, and output a third output signal 111 that is different than the first input signal 14, the first output signal 26, and the second output signal 31.

While various embodiments have been described above, this disclosure is not intended to be limited thereto. Variations can be made to the disclosed embodiments that are still within the scope of the appended claims.

What is claimed is:

1. A method of operating a valve controller assembly, the valve controller assembly including a first switch that generates a first input signal based on an operational parameter of a control valve and a docking assembly communicatively coupled to the first switch, the method comprising:

securing a first switching module to the docking assembly such that the first switching module is communicatively coupled to the docking assembly, the first switching module including a first emulation circuit adapted to receive the first input signal, process the first input signal, and output a first output signal that is different than the first input signal;

removing the first switching module from the docking assembly such that the first switching module is not communicatively coupled to the docking assembly; and securing a second switching module to the docking assembly such that the second switching module is communicatively coupled to the docking assembly, the second switching module including a second emulation circuit adapted to receive the first input signal, process the first input signal, and output a second output signal that is different than the first input signal and the first output signal;

wherein the first switch and the docking member are each fixed to a printed circuit board.

2. The method of claim 1, further comprising removing all or a portion of a controller enclosure prior to securing the first switching module to the docking assembly.

3. A method of controlling a control valve comprising:
generating a first input signal from a first switch, the first input signal based on an operational parameter of the control valve;
processing the first input signal using a first emulation circuit included in a first switching module, the first switching module being communicatively coupled to a docking assembly that is communicatively coupled to the first switch; and
outputting a first output signal from the first emulation circuit, the first output signal being different than the first input signal;
processing the first input signal using a second emulation circuit included in a second switching module, the second switching module being communicatively coupled to the docking assembly that is communicatively coupled to the first switch; and
outputting a second output signal from the second emulation circuit, the second output signal being different than the first input signal and the first output signal;
wherein the first switch and the docking member are each fixed to a printed circuit board.

4. The method of claim 3, further comprising transmitting the first output signal to a device.

5. The method of claim 3, wherein processing the first input signal using the first emulation circuit includes reducing the voltage of the first input signal such that the first output signal has a lower voltage than the first input signal.

6. The method of claim 3, wherein processing the first input signal using the first emulation circuit includes reducing the current of the first input signal such that the first output signal has a lower current than the first input signal.

7. A valve controller system comprising:
a first switch that generates a first input signal based on an operational parameter of a control valve;
a docking assembly communicatively coupled to the first switch;
a first switching module adapted to be removably secured to and communicatively coupled to the docking assembly such that the first switch is communicatively coupled to the first switching module when the first switching module is secured to the docking assembly, the first switching module including a first emulation circuit adapted to receive the first input signal, process the first input signal, and output a first output signal that is different than the first input signal;
a second switching module adapted to be removably secured to and communicatively coupled to the docking assembly such that the first switch is communicatively coupled to the second switching module when the second switching module is secured to the docking assembly, the second switching module including a second emulation circuit adapted to receive the first input signal, process the first input signal, and output a second output signal that is different than the first input signal and the first output signal;
wherein the first switch and the docking member are each fixed to a printed circuit board.

8. The valve controller system of claim 7, further comprising a controller enclosure, the first switch and the docking member being secured within an interior volume of the controller enclosure.

9. The valve controller system of claim 7, wherein the first emulation circuit is disposed within a housing of the first switching module and the second emulation circuit is disposed within a housing of the second switching module.

10. The valve controller system of claim 7, wherein the first switch is a magnetically-triggered proximity switch.

11. The valve controller system of claim 7, further comprising a second switch that generates a second input signal, the docking assembly being communicatively coupled to the second switch such that when the first switching module is coupled to the docking assembly, the second switch is communicatively coupled to the first switching module, the first emulation circuit adapted to receive the second input signal, process the second input signal, and output a third output signal that is different than the second input signal.

12. The valve controller system of claim 7, wherein the first emulation circuit reduces one of the voltage or the current of the first input signal such that the first output signal has a lower voltage or current than the first input signal.

13. A control valve assembly comprising:
a control valve having an inlet, an outlet, and a closure element adapted to displace from a first position in which process fluid flows from the inlet to the outlet to a second position in which process fluid is prevented from flowing from the inlet to the outlet;
an actuator coupled to the closure element to displace the closure element;
a valve controller in communication with the actuator to control the displacement of the closure element, the valve controller comprising:
a first switch that generates a first input signal based on an operational parameter of a control valve;
a docking assembly communicatively coupled to the first switch;
a first switching module adapted to be removably secured to and communicatively coupled to the docking assembly such that the first switch is communicatively coupled to the first switching module when the first switching module is secured to the docking assembly, the first switching module including a first emulation circuit adapted to receive the first input signal, process the first input signal, and output a first output signal that is different than the first input signal;
a second switching module adapted to be removably secured to and communicatively coupled to the docking assembly such that the first switch is communicatively coupled to the second switching module when the second switching module is secured to the docking assembly, the second switching module including a second emulation circuit adapted to receive the first input signal, process the first input signal, and output a second output signal that is different than the first input signal and the first output signal;
wherein the first switch and the docking member are each fixed to a printed circuit board.

14. The control valve assembly of claim 13, further comprising a controller enclosure, the first switch and the docking member being secured within an interior volume of the controller enclosure.

15. The control valve assembly of claim 13, wherein the first emulation circuit is disposed within a housing of the first switching module and the second emulation circuit is disposed within a housing of the second switching module.

16. The control valve assembly of claim 13, wherein the first switch is a magnetically-triggered proximity switch.

17. The control valve assembly of claim 13, further comprising a second switch that generates a second input signal, the docking assembly being communicatively coupled to the second switch such that when the first switching module is coupled to the docking assembly, the second switch is communicatively coupled to the first switching module, the first emulation circuit adapted to receive the second input signal, process the second input signal, and output a third output signal that is different than the second input signal.

18. The control valve assembly of claim 13, wherein the first emulation circuit reduces one of the voltage or the current of the first input signal such that the first output signal has a lower voltage or current than the first input signal.

19. The control valve assembly of claim 13, further comprising a target assembly coupled to the closure element, the target assembly including a first magnet, and the first switch adapted to detect the first magnet when the first magnet comes within a predetermined range of the first switch, wherein the first input signal is outputted by the first switch when the first magnet comes within the predetermined range of the first switch or when the first magnet is outside the predetermined range of the first switch.

20. The control valve assembly of claim 19, further comprising a controller enclosure, the first switch, the docking member, the first switching module, and the target assembly being disposed within an interior volume of the controller enclosure.

21. The control valve assembly of claim 13, further comprising a positioner coupled to the actuator and communicatively coupled to the valve controller such that the controller instructs the positioned to displace the closure element.

* * * * *

UNITED STATES PATENT AND TRADEMARK OFFICE
CERTIFICATE OF CORRECTION

PATENT NO.         : 9,541,214 B2
APPLICATION NO.    : 14/448799
DATED              : January 10, 2017
INVENTOR(S)        : Bruce R. Penning et al.

Page 1 of 2

It is certified that error appears in the above-identified patent and that said Letters Patent is hereby corrected as shown below:

On the Title Page

Item (56), Line 1, "Channell" should be -- Channell et al. --.

Item (56), Line 3, "Jacobsen" should be -- Jacobsen et al. --.

On Page 2, item (56), Line 3, "Ghazarian" should be -- Ghazarian et al. --.

On Page 2, item (56), Line 5, "Elshafei" should be -- Elshafei et al. --.

In the Drawings

At fig. 4, sheet 5 of 5, Tag "129" should be Tag -- 12a --.

In the Specification

At Column 2, Line 64, "is" should be -- is a --.

At Column 3, Line 1, "is" should be -- is a --.

At Column 3, Line 31, "module 20" should be -- module 22 --.

At Column 5, Line 17, "pivoable" should be -- pivotable --.

At Column 5, Line 20, "pivoable" should be -- pivotable --.

At Column 7, Line 2, "that" should be -- than --.

At Column 7, Line 28, "signal" should be -- signal. --.

Signed and Sealed this
Twenty-third Day of January, 2018

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,541,214 B2

At Column 8, Line 47, "may be have" should be -- may have --.

At Column 10, Line 7, "module 20," should be -- module 22, --.

At Column 10, Line 48, "may be have" should be -- may have --.